United States Patent Office 3,354,230
Patented Nov. 21, 1967

3,354,230
NOVEL CARBINOLS AND PROCESS FOR PREPARATION
Allan Murry Feldman, Norwalk, and Arthur Kentaro Hoffmann, New Canaan, Conn., assignors to American Cyanamid Company, Stamford, Conn., a corporation of Maine
No Drawing. Filed Apr. 27, 1965, Ser. No. 451,305
3 Claims. (Cl. 260—618)

ABSTRACT OF THE DISCLOSURE

Process for preparing carbinols of the formula:

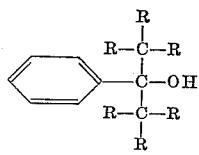

wherein R is hydrocarbon, by the reaction in benzene of potassium, rubidium or cesium with the corresponding ketone of the formula:

$$R-\underset{\underset{R}{|}}{\overset{\overset{R}{|}}{C}}-\overset{O}{\overset{\|}{C}}-\underset{\underset{R}{|}}{\overset{\overset{R}{|}}{C}}-R$$

and hydrolysis of the resulting product.

---

This invention relates to novel carbinols and to a process for preparing the same.

More particularly, this invention relates to a novel carbinol of the structure:

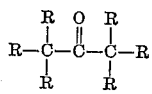
(I)

wherein the R groups are hydrocarbon radicals, each of which contains not more than 7 carbon atoms, selected from the group consisting of saturated acyclic and alicyclic radicals, and wherein two of such R's attached to the same or different carbon atoms, can, when taken with said carbon atoms, form a completed alicyclic ring of 5 or 6 carbon atoms. When acyclic, the groups may be straight or branched chain and may be the same or different to form symmetrical or unsymmetrical compounds. Further, it will be seen from Formula I that when two of the R's bonded to the same carbon atom are combined to form a completed ring, that ring will include a carbon atom which is directly bonded to the hydroxyl group.

The novel carbinols are prepared by a process involving, for the first time so far as is known, the addition of an anion radical to an aromatic ring. These reactions may be represented as follows in which the R groups are as already defined, including ring structures of any two R's with a carbon atom directly bonded to the carbonyl group (—CO—), and M is potassium, rubidium or cesium metal. Sodium and lithium metals are inoperative in the process.

In Equation 1(a) the metal (M) is reacted with the appropriate ketone to form a metal alkoxide anion radical conventionally known as a "ketyl." The latter species then adds to benzene to form what is thought to be an unstable intermediate radical which intermediate reacts with a second metal alkoxide anion radical to form stable neutral metal alkoxides. In Equation 1(b) the neutral metal alkoxides are hydrolyzed by water to the carbinol forms.

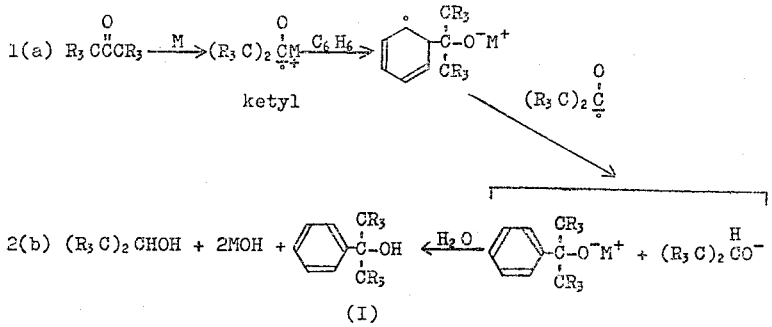

(I)

In practice the new carbinols are best prepared by intimately mixing or preferably dissolving the substituted ketone in an amount of benzene sufficient to provide fluidity of the reaction mixture during and after formation of the products. From about 4 to 50 moles, preferably from about 10 to 20 moles, of benzene per mole of ketone will be adequate for this purpose. Thereafter slightly in excess of one mole of metal per mole of ketone, e.g., about 5 to 20% molar excess, is added to the reaction mixture which is then agitated in the conventional manner to effect reaction.

Temperature and reaction time are not critical. Thus the mixture may be reacted at from about 5° C. to 80° C., preferably 20° C. to 40° C., for from about several minutes to several days. Reaction is essentially complete upon disappearance of the metal which occurs in about 1 to 2 days at ambient temperatures. Order of addition of the reactants is also not critical. For example, the metal may first be added to the ketone followed by addition and reaction with benzene or the metal may be added to a mixture of the ketone in benzene as already explained. All reaction mixtures, however formed, should have a degree of miscibility which will provide sufficient fluidity for reaction.

Substituted ketones useful in the process are ketones of the structures shown in Equation 1(a) above and include compounds, such as those prepared by the process of U.S. Patent 2,742,503 to Hansley (incorporated herein by reference), as follows:

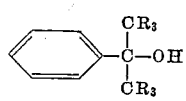

Hexamethyl acetone
3,3,5,5-tetramethyl heptanone-4
2,2,4,4,6,6,8,8-octamethyl nonanone-5
2,3,3,5,5,6-hexamethyl heptanone-4
Hexaethyl acetone
3,5-diethyl-3,5-dimethyl heptanone-4
4,4,6,6-tetramethyl nonanone-5
3,5-diethyl-2,3,5,6-tetramethyl heptanone-4
5,5,7,7-tetramethyl undecanone-6
6,6,8,8-tetramethyl tridecanone-7
4,4,6,6-tetraethyl nonanone-5
2,2,3,3,5,5,6,6-octamethyl heptanone-4
7,7,9,9-tetramethyl pentadecanone-8
5,5,7,7-tetraethyl undecanone-6
3,7,7,9,9,13-hexamethyl pentadecanone-8
4,4,6,6-tetraethyl-2,3,7,8-tetramethyl nonanone-5
2,3,4,4,6,6,7,8-octamethyl nonanone-5
Bis-(1-methylcyclohexyl)ketone
2,2,6,6-tetramethyl cyclohexanone
2,2,5,5-tetramethyl cyclopentanone It will be evident that the above list is nonlimiting and that other ketones wherein the R's are as already defined may also be employed.

The neutral metal alkoxide product of Equation 1(a) may be isolated and utilized in this form or, preferably, the product will be hydrolyzed to the carbinol form by the addition of water as illustrated in Equation 1(b). Upon hydrolysis the reaction mixture will separate into layers. The organic layer containing the carbinol product may then be separated and the carbinol purified by conventional procedures such as drying over magnesium sulfate and distilling off excess solvent.

The carbinols and process of the present invention are unique particularly in view of unsuccessful attempts to alkylate benzene with ketyls prepared from other carbonyl function containing molecules. For example, acetone, cyclopentanone and isophorone reacted with potassium in benzene give predominately aldol condensation products without incorporating the phenyl ring. Moreover, when benzene solutions of dimethyldiethylmalonate are reduced with two equivalents of sodium or potassium, no evidence is found for phenyl attack by the anion radical ketyl intermediate. Instead, ethyl isobutyrlisobutyrate is identified as the major product. Also, using toluene or cumene as solvent in place of benzene, hydrolysis of the reaction mixture after complete dissolution of potassium in hexamethylacetone and solvent yields only di-t-butyl carbinol. And when polynuclear compounds such as naphthalene and biphenyl are reacted with hexamethylacetone and potassium in benzene, the predominant products on quenching the reaction mixture with methyl iodide are methyl (di-t-butylmethyl carbinyl ether) and a carbinol lacking aromatic character. It thus appears that only in benzene is the ketyl, formed from the starting ketones and metal, sufficiently reactive to alkylate the phenyl ring without degradation of solvent.

The present process makes possible the facile preparation of carbinols useful in the preparation of other compounds. For example, the carbinols may be reacted with phosgene and then peroxidized to useful peroxy ester free radical polymerization initiators in the following manner:

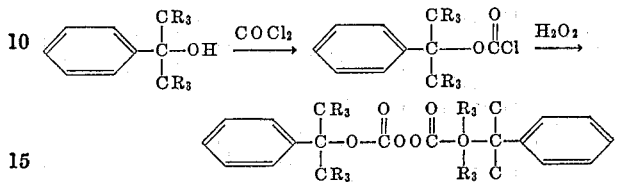

The reaction is substantially the same when other products of the invention are employed. The products of the invention are also useful plasticizers for synthetic resins such as polyvinyl acetate, polyesters and the like.

In order that the present invention may be more completely understood, the following examples are given in which all parts are parts by weight unless otherwise specified. These examples are set forth primarily for the purpose of illustration and any specific enumeration of detail contained therein should not be interpreted as a limitation on the case except where indicated in the appended claims.

EXAMPLE 1

*Di-t-butylphenyl carbinol (α,α-di-tert-butylbenzyl alcohol)*

2.75 grams (0.071 mole) of potassium is added to 10 grams (0.0705 mole) of hexamethylacetone in 125 cc. benzene and the mixture stirred until the metal disappears. Water is added, the organic layer is separated and dried over $MgSO_4$ and the bulk of the solvent is removed by distillation. Analysis by vapor phase chromatography shows an 84% yield of di-t-butylcarbinol and a 64% yield of di-t-butylphenyl carbinol, each based on hexamethylacetone. The latter product when isolated by preparative vapor phase chromatography was confirmed as to structure by IR, NMR and mass spectroscopy as well as by analysis.

*Analysis.*—Calcd. for $C_{15}H_{24}O$: C, 81.76; H, 10.98. Found: C, 81.63; H, 10.72.

EXAMPLE 2

*2,2,6,6-tetramethyl-1-phenylcyclohexanol*

The following equations illustrate the preparation of 2,2,6,6-tetramethyl-1-phenylcyclohexanol (II) from 2,2,6,6-tetramethyl cyclohexanone wherein R is methyl and M is metallic potassium, rubidium or cesium. The reaction conditions are substantially the same as in Example 1.

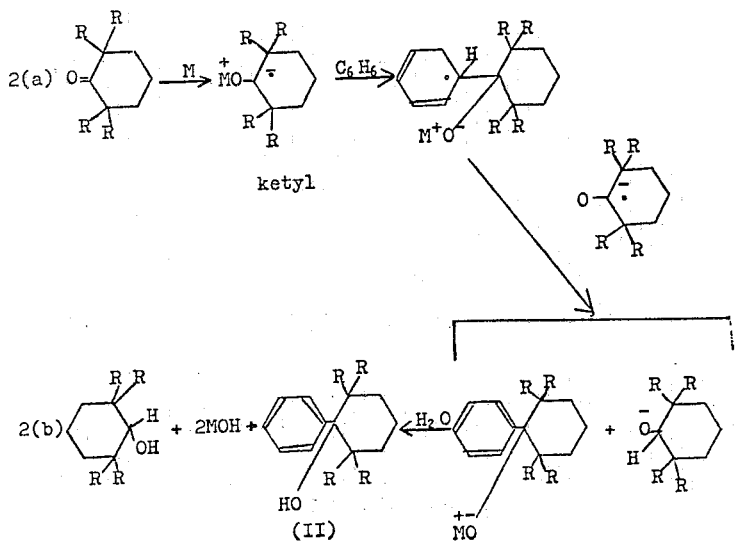

EXAMPLES 3–20

Substantially in accordance with the procedures of Examples 1 and 2 above, the following carbinols are prepared from the corresponding ketones described hereinabove.

(3) 3,3,5,5-tetramethyl-4-phenyl-4-heptanol
(4) 2,2,4,4,6,6,8,8-octamethyl-5-phenyl-5-nonanol
(5) 2,3,3,5,5,6-hexamethyl-4-phenyl-4-heptanol
(6) 3,3,5,5-tetraethyl-4-phenyl-4-heptanol
(7) 3,5-diethyl-3,5-dimethyl-4-phenyl-4-heptanol
(8) 4,4,6,6-tetramethyl-5-phenyl-5-nonanol
(9) 3,5-diethyl-2,3,5,6-tetramethyl-4-phenyl-4-heptanol
(10) 5,5,7,7-tetramethyl-6-phenyl-6-undecanol
(11) 6,6,8,8-tetramethyl-7-phenyl-7-tridecanol
(12) 4,4,6,6-tetraethyl-5-phenyl-5-nonanol
(13) 2,2,3,3,5,5,6,6-octamethyl-4-phenyl-4-heptanol
(14) 7,7,9,9-tetramethyl-8-phenyl-8-pentadecanol
(15) 5,5,7,7-tetraethyl-6-phenyl-6-undecanol
(16) 3,7,7,9,9,13-hexamethyl-8-phenyl-8-pentadecanol
(17) 4,4,6,6-tetraethyl-2,3,7,8-tetramethyl-5-phenyl-5-nonanol
(18) 2,3,4,4,6,6,7,8-octamethyl-5-phenyl-5-nonanol
(19) Bis(1-methylcyclohexyl)phenylmethanol
(20) 2,2,5,5-tetramethyl-1-phenylcyclopentanol

We claim:
1. A process for preparing a novel carbinol of the formula

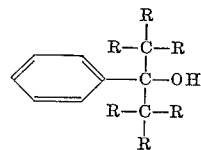

wherein the R groups are hydrocarbon radicals, each of which contains not more than 7 carbon atoms, selected from the group consisting of saturated acyclic and alicyclic radicals, and wherein two of such R's attached to the same or different carbon atoms, can, when taken with said carbon atoms, form a completed alicyclic ring of 5 to 6 carbon atoms, which comprises reacting a metal selected from the group consisting of potassium, rubidium and cesium with a mixture in benzene of a ketone of the formula

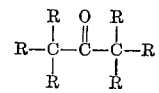

wherein the R groups have the same significance as above, and hydrolyzing the resulting reaction product.

2. A process for preparing di-t-butylphenyl carbinol which comprises reacting potassium with a mixture of hexamethylacetone in benzene and hydrolyzing the resulting reaction product.

3. A process for preparing 2,2,6,6-tetramethyl-1-phenylcyclohexanol which comprises reacting potassium with a mixture of 2,2,6,6-tetramethyl cyclohexanone in benzene and hydrolyzing the resulting reaction product.

References Cited

UNITED STATES PATENTS 2,242,516   5/1941   Duval _____ 260—618

OTHER REFERENCES

Garbisch, Jour. Org. Chem., vol. 27, pages 4243–49 (1962).

Sidorova et al., Chemical Abstracts 55, 6451–52 (1961).

Baltzly et al., Jour. Amer. Chem. Soc., vol. 65, pages 1984–89 (1943).

Fischer et al., Jour. Chem. Soc. (1963), pages 751–753.

LEON ZITVER, *Primary Examiner.*

H. MARS, *Assistant Examiner.*